(12) United States Patent
Kivelä et al.

(10) Patent No.: US 7,655,192 B2
(45) Date of Patent: Feb. 2, 2010

(54) METHOD AND APPARATUS FOR DISCHARGING POLYMERIZATION REACTORS

(75) Inventors: Jouni Kivelä, Porvoo (FI); Klaus Nyfors, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 11/075,921

(22) Filed: Mar. 10, 2005

(65) Prior Publication Data
US 2005/0152816 A1    Jul. 14, 2005

Related U.S. Application Data

(62) Division of application No. 09/831,600, filed as application No. PCT/FI99/00941 on Nov. 12, 1999.

(30) Foreign Application Priority Data
Nov. 12, 1998  (FI)  .................................. 982456

(51) Int. Cl.
*B01J 8/18* (2006.01)
*C08G 85/00* (2006.01)
*C08F 2/00* (2006.01)

(52) U.S. Cl. .......................... 422/139; 526/69; 526/70; 526/74

(58) Field of Classification Search ................ 422/139; 526/69, 70, 74
See application file for complete search history.

(56) References Cited

U.S. PATENT DOCUMENTS

| | | |
|---|---|---|
| 4,495,337 A | 1/1985 | Raufast |
| 4,535,134 A | 8/1985 | de Lorenzo et al. |
| 4,543,399 A | 9/1985 | Jenkins, III et al. |
| 4,803,251 A | 2/1989 | Goode et al. |
| 4,973,459 A * | 11/1990 | Lippert et al. .......... 423/244.01 |
| 5,326,835 A | 7/1994 | Ahvenainen et al. |

(Continued)

FOREIGN PATENT DOCUMENTS

EP    0 006 288 A1    1/1980

(Continued)

OTHER PUBLICATIONS

H. Feldman, *Powder and Bulk Engineering*, "Selecting a lump breaker for gross size reduction," Jun. 1987, pp. 26-29.

(Continued)

*Primary Examiner*—William K Cheung
(74) *Attorney, Agent, or Firm*—Birch, Stewart, Kolasch & Birch, LLP

(57) ABSTRACT

A method and an apparatus of discharging polymer from a continuously operated gas phase reactor, wherein at least one monomer is polymerized in a bed containing active catalyst formed by catalyst and polymer particles suspended in a fluid, the bed defining a fluidized bed level in said reactor. The invention includes continuously withdrawing polymer powder from the reactor; and adjusting the discharge rate of the polymer powder so as to maintain a constant bed level during polymerization. By means of the invention the discharge of the polymer can be made truly continuous without any disturbance of the polymerization. The rate of withdrawn polymer can be flexibly adjusted depending on the progress of the polymerization and it can also easily be scaled up if the capacity of the reactor is increased.

20 Claims, 2 Drawing Sheets

U.S. PATENT DOCUMENTS 5,834,571 A * 11/1998 Bernier et al. .............. 526/68
5,939,027 A     8/1999 Ruelle

FOREIGN PATENT DOCUMENTS

| EP | 0 024 933 A2 | 3/1981 |
|---|---|---|
| EP | 0 245 043 A2 | 11/1987 |
| EP | 0 381 364 A1 | 8/1990 |
| EP | 0 381 364 B1 | 8/1990 |
| EP | 0 517 868 B1 | 12/1992 |
| EP | 0 830 892 A1 | 3/1998 |
| EP | 0 870 539 A2 | 10/1998 |
| EP | 0 870 539 A2 | 10/1998 |
| JP | 58/113208 | 7/1983 |
| JP | 3-229633 A | 10/1991 |
| WO | WO-97/04015 A1 | 2/1997 |

OTHER PUBLICATIONS

G. Stolhandske, *Powder and Bulk Engineering*, "Breaking your lumps: Crushers and how to select one," Jun. 1997, pp. 49-57.

Notice of Opposition, European Patent No. 1159305 B1 (99972228.3).

* cited by examiner

METHOD AND APPARATUS FOR DISCHARGING POLYMERIZATION REACTORS

CROSS-REFERENCE TO RELATED APPLICATIONS

This application is a 37 C.F.R. § 1.53(b) divisional of U.S. application Ser. No. 09/831,600, filed May 11, 2001. Application Ser. No. 09/831,600 is the national phase under 35 U.S.C. § 371 of PCT International Application No. PCT/FI99/00941, which has an International filing date of Nov. 12, 1999, which designated the United States of America and was published in English.

BACKGROUND OF THE INVENTION

1. Field of the Invention

The present invention relates to a method of producing polymers in a continuously operated polymerization reactor. In particular, the invention concerns a method of continuously withdrawing solid polymer powder from a fluidized bed polymerization reactor with high throughput. The present invention also concerns an apparatus for continuous withdrawal of polymer powder from a fluidized bed polymerization reactor.

2. Description of Related Art

A number of processes for preparing polymers in a fluidized bed reactor are known in the art. Such processes are described in, e.g., EP Patent Specification No. 0 517 868, U.S. Pat. No. 4,543,399 and EP Patent Application No. 0 381 364. The processes are primarily designed for the production of polyethylene but they can also be modified for preparing other polyolefins, such as polypropylene. In the process described in EP Patent Specification No. 0 517 868, the fluidized bed reactor acts as a second reactor in a two-reactor train, in the other above-mentioned processes it is a stand-alone reactor.

Conventional gas phase fluidized bed reactors comprise an elongated reactor body generally having a vertical central axis. The monomers are polymerized in a fluidized bed above a fluidization grid located in the bottom end of the reactor body. A gaseous stream containing monomer, and optionally alpha-olefin comonomer(s), hydrogen and inert gas(es) is introduced to the bottom of the bed through the fluidization grid. The unreacted gas is collected from the top of the bed, cooled and recycled to the bottom of the reactor. The polymer product is withdrawn from the lower part of the reactor above the fluidization grid. Active catalyst is introduced into the bed, either as a fresh catalyst or as polymer particles from a prior polymerization stage, wherein the active catalyst is dispersed.

The polymerization system of a gas phase reactor used for polymerization of α-olefins comprises a fluidized bed consisting of polymer particles containing the active catalyst within, and a gaseous reaction medium. The bed can be maintained in the fluidized state by mechanically mixing or stirring the contents of the reactor and additionally or alternatively by blowing the monomer(s), i.e. the olefin(s), and/or an inert reaction medium (e.g. nitrogen and/or an easily volatile hydrocarbon) into it in a gaseous state. In the case of a fluidized bed process, the velocity of the gas needs to be sufficient to support or fluidize the polymer particles. The monomer(s) and/or an inert reaction medium in liquid state can be introduced into the polymerization system and the polymerization can be carried out while gasifying said monomer(s) and/or reaction medium. The unreacted monomer(s) and/or inert reaction medium can be partly or wholly liquefied and recycled in liquid state into the polymerization system, as disclosed in EP-A1 0 024 933.

As disclosed in a U.S. Pat. No. 4,803,251, sheet formation is occasionally encountered in gas phase reactors. The sheets are particle agglomerates having a thickness of about 6 to 15 mm, length of about 30 to 150 cm and width of 7.5 to 45 cm or more. The sheets consist of fused polymer. According to U.S. Pat. No. 4,803,251, the formation of sheets is associated with static electricity. The possible formation of hot spots, which eventually may lead to chunk formation as disclosed in EP 0 089 691, was also discussed.

Conventionally, the withdrawal of the polymer product from a gas phase reactor is carried out batch-wise. A typical batch discharge process consists of the following steps: When the surface level within the gas phase reactor rises as a result of polymerization, polymer powder is discharged through an on/off valve to an outlet tank. A part of the fluidizing gas entering the tank with powder is recycled by a compressor back to the fluidized bed. The degassed powder is recovered and optionally subjected to further processing.

By means of the batch-wise discharge system described above it is possible to remove not only the polymer powder but also lumps formed in the reactor, because the outlet nozzles of the system have a large diameter, generally much larger than required by the withdrawal of the powder.

There are, however, some serious disadvantages associated with conventional technology.

The batchwise discharge is a rather complicated system. It comprises several phases and a number of on/off valves, which typically operate tens of times an hour. There has to be at least two discharge systems, in large plants even more. This feature makes the batch-wise discharge system rather expensive as an investment and also the maintenance is cost-consuming. The complexity of the system also makes it vulnerable; if the discharge system becomes clogged or there is a serious failure in the system, the whole plant has to be shut down.

Further, the batch-wise discharge is inflexible because it is difficult to increase its capacity when the capacity of the whole plant is increased. Instead, a major rise in the production capacity requires the addition of a new expensive discharge system.

As regards the operation of the system, it can be noted that there is a distinct fluctuation in the bed level when a batch of the polymer product is withdrawn from the reactor. This fluctuation influences the monomer concentration and, thus, also other parameters, such as the concentration of hydrogen and comonomers, which all taken together have a strong impact on the the quality of the polymer product.

The discontinuous operation of the outlet system also leads to a pulsating operation of the recycle gas compressor. This, again, leads to increased wear.

Some alternative systems for withdrawal of polymer powder from a fluidized bed reactor are also described in the art. Such processes are described in EP Published Patent Applications Nos. 0 006 288 and 0 245 043 and U.S. Pat. No. 4,495,337.

The last-mentioned document discloses a process for bottom drainage of a fluid-bed reactor, in which the reactor is provided not only with a vertical bottom pipe but also with a lateral evacuation pipe located above the distribution plate of the reactor. The side pipe makes it possible to evacuate a part of the polymer formed in the reactor. According to the reference, to empty the reactor, first all the fraction of polymer powder located above the level of the outlet pipe is discharged by means of the lateral pipe, then total drainage of the reactor is carried out via the vertical bottom pipe.

EP A1 0 006 288 and A1 0 245 043 disclose discharge systems which are discontinuously or continuously operated. In EP A1 0 006 288 the discharge is effected via a dipleg, which passes from the top of the reactor to a point near the bottom. The dip leg is connected to an on/off valve, which is opened intermittently. When the valve is open, a mixture of polymer and monomer is passed on to a cyclone in which most of the monomer vapour is separated from the polymer. The monomer can be recycled to the reactor via compressor.

EP A1 0 245 043 teaches an apparatus for degassing and pelleting polyolefins, in which there is an outlet nozzle which is equipped with a lock chamber placed between two valves activated alternately. The mixture of gas and solid particles, withdrawn from the reactor, is treated in a primary degasser for separating the solid phase from a part of the gas phase accompanying the particles. The gases containing monomers are recycled into the reactor by a pipe.

Although the prior art suggests that the above three alternative discharge systems can be not only periodically operated but also continuously, none of them is in fact adapted for such operation. It should be noted that the control valves described in EP A1 0 006 288 and A1 0 245 043 are actually intermittently operated which means that there is no continuous stream of polymer powder through the outlet nozzles. Thus, these systems are merely improved batch discharge systems, which have the same main disadvantages as described above. The discharge system of U.S. Pat. No. 4,495,337 is, on the other hand, suitable for draining of the whole content of the reactor rather than for allowing for continuous withdrawal of polymer powder.

JP-A-58/113208 discloses a process for continuously polymerizing olefins in vapour phase. The level of the fluidized bed is determined by measuring the pressure difference between two specified locations in the bed. The document further indicates that the polymer can be withdrawn either continuously or intermittently. How the suggested continuous withdrawal is made in practice is not disclosed.

EP-A-0 870 539 discloses an apparatus for polymerizing olefins in gas phase. FIG. 2 and column 8, lines 21-55 of the document describe an embodiment, wherein the polymer is withdrawn continuously from the reactor. The document does not refer to the presence of any chunks or sheets among the polymer, and does not suggest how these should be handled when withdrawing polymer from the reactor. It merely discusses how the gas discharge pipe should be installed to prevent it from blocking.

SUMMARY OF THE INVENTION

It is an object of the present invention to eliminate the problems related to the prior art of polymer powder discharge systems and to provide a simple discharge method with high throughput, which is capable of stabilizing fluidized bed polymerization reactor control and downstream equipment operation.

Another object of the present invention is to provide a discharge system with low investment cost and substantially reduced maintenance cost.

These and other objectives, together with the advantages thereof over known processes, which shall become apparent from the following specification, are accomplished by the invention as hereinafter described and claimed.

The present invention is based on the concept of polymerizing at least one monomer in a gas phase reactor by continuously feeding a monomer into a bed formed by catalyst polymer particles suspended in a fluid and defining a bed level in the reactor. According to the invention free-flowing polymer powder is continously with-drawn through a discharge pipe, while simultaneously monitoring the surface level of the fluidized bed within a gas phase reactor, and controlling the flow of material through the pipe depending on the surface level so as to maintain an essentially constant bed level. To achieve this aim, the gas phase reactor is provided with an outlet nozzle which is equipped with a continuously operated control valve for the powder discharge. The control signal for the control valve comes from a fluidized bed level controller. The bed level is typically measured with a pressure difference or radio-active device.

Further, the present invention comprises withdrawing and separately (continuously or discontinuously) recovering particle agglomerates from the reactor.

The discharge system comprises an outlet nozzle, a control valve and a bed level indicator. Preferably the system further comprises a collecting vessel placed in communication with the outlet pipe for separating gas from solid material. The particle agglomerates are either withdrawn directly from the reaction via a separate outlet or the agglomerates are separated from the continuous flow of polymer powder.

More specifically, the method according to the present invention is characterized by a method of producing a polymer in a continuously operated gas phase reactor, comprising polymerizing at least one monomer in a bed containing active catalyst formed by catalyst and polymer particles suspended in a fluid, said bed defining a fluidized bed level in said reactor, continuously withdrawing polymer powder from the reactor;

adjusting the discharge rate of the polymer powder so as to maintain a constant bed level during polymerization; and withdrawing and separately recovering particle agglomerates from the reactor.

The apparatus according to the present invention is characterized by an apparatus for discharging polymer from a continuously operated gas phase reactor, wherein at least one monomer is polymerized in a bed containing active catalyst formed by catalyst and polymer particles suspended in a fluid, said bed defining a fluidized bed level in said reactor, said apparatus comprising:

an outlet nozzle communicating with the fluidized bed of the gas phase reactor, a collecting vessel placed in communication with the outlet nozzle for separating gas from solid material, with a screen for collecting the lumps and a separate discharge nozzle for the lumps;

a continuously operating valve for adjusting the amount of polymer powder withdrawn from the reactor via the outlet nozzle; and means for controlling the operation of the valve for adjusting the discharge rate of the polymer powder so as to maintain a constant bed level during polymerization.

The present invention provides considerable advantages. Thus, the discharge of the polymer can be made truly continuous without any disturbance of the polymerization. The rate of withdrawn polymer can be flexibly adjusted depending on the progress of the polymerization and it can also easily be scaled up if the capacity of the reactor is increased. Further, it has been observed that a mixture of gas and polymer can pass through the continuously operating control valve. Such a mixture can be used for pneumatically conveying polymer powder. Also, it has been observed that less reaction gas is discharged than with batchwise systems.

Particularly well the continuous outlet system is suited to a process where the outlet from the gas phase reactor is either directly or indirectly fed into another gas phase reactor. This avoids the control upsets in the next gas phase reactor due to the sequential powder feed.

Generally, it has not been deemed possible to achieve continuous discharge because in particular in a PE reactor there are formed considerable amounts of lumps and clogs and the size of a continuously operating outlet nozzle is so small that such lumps will eventually cause clogging thereof. By the present invention it is possible to avoid said problem.

Next, the invention will be examined more closely with reference to the attached drawings and a detailed description.

DETAILED DESCRIPTION OF THE INVENTION

Figure 1:
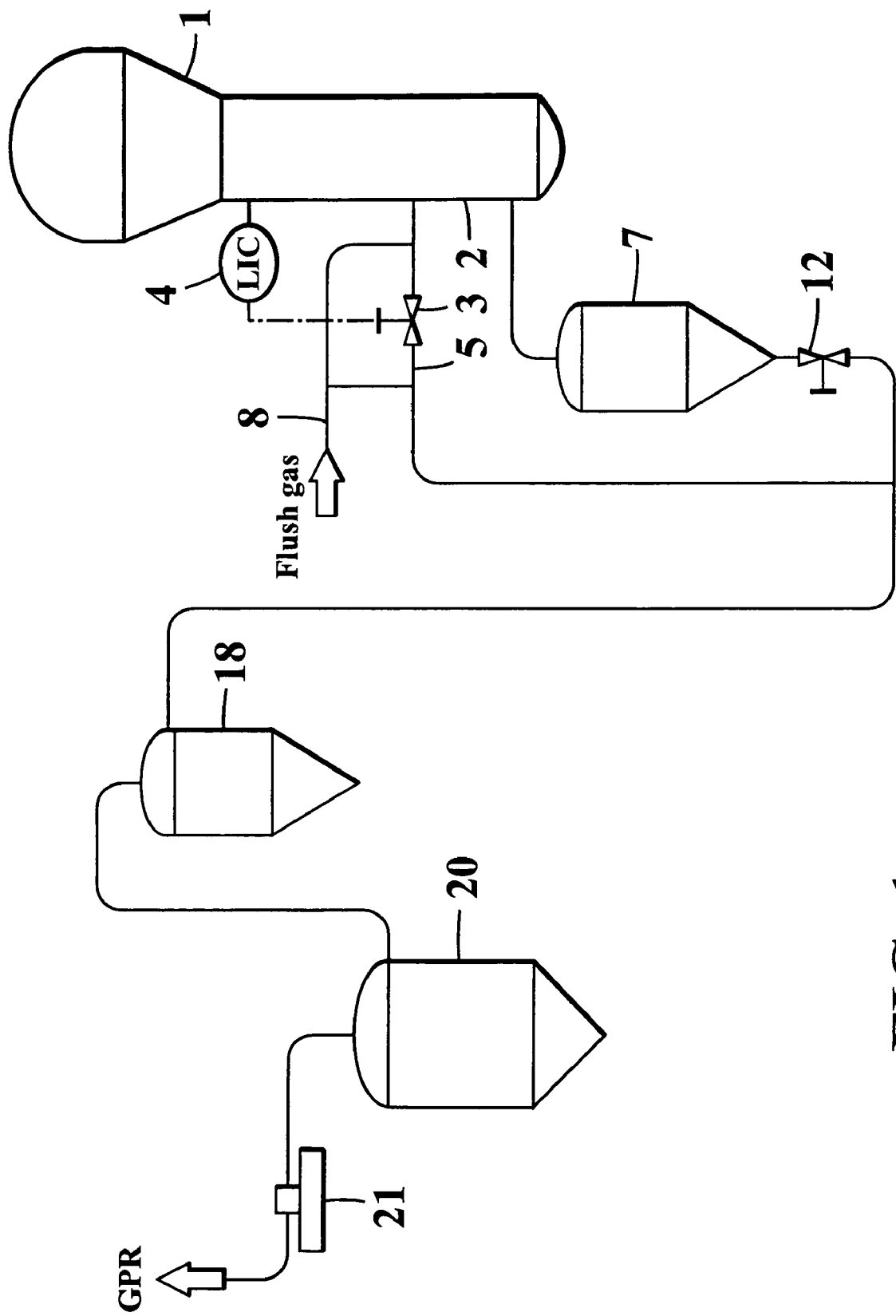
FIG. 1 shows in a schematical fashion a first embodiment of the invention comprising a fluidized bed reactor with an outlet nozzle, a pipe, a continuously operated control valve provided with means for flushing of the valve, and a processing section for separating gas containing unreacted monomers from the polymer powder.

According to the invention, the present method is used for discharging polymer from a continuously operated gas phase reactor, wherein at least one monomer is polymerized in a bed containing catalyst and polymer particles suspended in a fluid, said bed defining a fluidized bed level in said reactor. The catalyst can be fed into the gas phase reactor as a stream comprising polymer and active catalyst together with reaction medium. Such a stream can be obtained from a slurry reactor, such as a loop reactor.

The method comprises continuously withdrawing polymer powder from the reactor and adjusting the discharge rate of the polymer powder so as to maintain a constant bed level during polymerization. As mentioned above, the discharge rate of the polymer powder is adjusted by using a continuously operated control valve. Preferred examples of such continuously operated valves are ball valves, V-ball valves and hose valves.

To ensure stable operation of the process, the polymer powder should be free-flowing. The flow properties of the polymer produced in the process depend on the average particle size, particle size distribution and especially shape of the polymer particles. These properties further depend on the corresponding properties of the catalyst used in the process. To achieve good flow properties, the polymer particles should have an average particle size between 150 and 4,000 microns, preferably between 200 and 2,000 microns. The particle size distribution should be such that no more than 30%, preferably no more than 15% by weight of the particles should have a diameter smaller than 100 microns. Moreover, the polymer particles should have a smooth surface and a regular appearance. Preferably the particles should have a spherical or near spherical shape.

Together with or separately from the free-flowing polymer powder, polymer agglomerates are also withdrawn from the reactor and recovered. They may be discarded or milled and mixed with the ready polymer. Polymer "particle agglomerates" are particles having a minimum thickness (in any dimension) of at least about 6 mm, in particular about 6 to 15 mm. They consist of polymer particles which are at least partially fused together. The agglomerates comprise sheets, chunks and lumps formed during polymerization, in particular in the gas phase reactor. As mentioned above, polymer agglomerates will be formed in particular during polymerization of ethylene.

The apparatus comprises an outlet nozzle communicating with the fluidized bed of the gas phase reactor, a collecting vessel placed in communication with the outlet nozzle for separating gas from solid material; a continuously operating valve for adjusting the amount of polymer powder withdrawn from the reactor via the outlet nozzle; and means for controlling the operation of the valve for adjusting the discharge rate of the polymer powder so as to maintain a constant bed level during polymerization. The continuously operating valve is preferably connected to the collecting vessel. Polymer agglomerates may be withdrawn from the reactor using a discharge line with a discontinuously operated discharge valve. Alternatively, polymer agglomerates are separated from the polymer powder in a collecting vessel provided with a screen for isolating the lumps, sheets or clogs.

A first preferred embodiment of the invention is shown in FIG. 1. In the drawing, the following reference numerals are used:

1. gas phase reactor
2. outlet nozzle of gas phase reactor
3. control valve
4. level indicator/controller
5. discharge line
7. collecting vessel
8. flush gas
12. valve regulating the flow of polymer powder
18. product receiver or second reactor
20. gas surge drum
21. compressor As shown in the drawing, polymer formed in the reactor 1 is withdrawn from a point below the bed level, via an outlet nozzle 2 and a control valve 3 together with a sufficient amount of gas for conducting the polymer to a degassing vessel 18 or to a subsequent reactor. The operation of the control valve 3 is controlled by the level indicator/controlling means 4. The gas separated from the polymer powder in the degassing section is recycled after the separation of the polymer to the gas phase reactor, as indicated by the arrow, and/or to a recovery section.

The continuous withdrawal is preferably used as a single discharge system in case of a reactor wherein the amount of lumps is small. The formation of lumps can be reduced by adding various antistatic agents or by avoiding feeding fresh catalyst to the gas phase reactor, as in a multi-step process. A particularly preferred multi-step process is represented by the system disclosed in EP Patent Specification No. 0 517 868, which comprises in combination a loop reactor and a gas phase reactor.

Even in this embodiment, it is advantageous to place the outlet nozzle 2 at a point where no or practically no lumps are present. To that aim the polymer powder can be continuously withdrawn from a point above a fluidization plate, since the lumps tend to accumulate on the fluidization plate. When a gas phase reactor is used, wherein the fluidized bed comprises a mechanically mixed bed, the polymer powder is preferably withdrawn from said mixed zone.

In order to reduce the risk of clogging of the discharge system, the outlet nozzle can be provided with a grid (not shown) flush mounted at the reactor wall to prevent lumps from entering the pipe. The term "flush mounted" means that the grid is installed so that it is at the same level as the surface of the inner wall of the reactor. It must not extend from the wall surface to the reactor, otherwise it would be covered with polymer. Also, it must not leave a pocket at the nozzle which would allow accumulation of polymer there. Further, the discharge line 5 and the control valve 3 can be discontinuously backflushed with a flushing gas flow through gas conduit 8 to prevent clogging. Similarly, the control valve 3 can be adjusted to provide for pulsating operation to prevent clogging of the valve by a control means 4. Preferably, this is done by opening the valve fully for a short time and then turning it back to its normal position. This procedure is automatically repeated with specified intervals.

Since it is normally not possible to avoid lump-forming totally, though it can be reduced to a minimum, as discussed above, it is preferred to combine the present continuous discharge system with a conventional batchwise system, as shown in FIG. 1. In the present embodiment the batch-wise discharge system is represented by a collecting tank 7, which is connected to the gas phase reactor via a gas conduit. By batch-wise withdrawal it is possible to prevent accumulation of lumps on the distribution plate of the gas phase reactor 1. In a process according to the present invention, the batchwise operated system can be designed for a substantially smaller capacity than conventionally and it can be operated less frequently, for example only once an hour or even only once a day. Generally one batchwise outlet nozzle should be enough for withdrawal of lumps (polymer aggregates). The lumps can be detected by radioactive detection sensors.

Typically, if the reactor is provided with a discontinuous polymer discharge system, the ratio between the polymer powder continuously discharged from the reactor to polymer powder discharge via the batchwise operated system is about 1:1 to 10,000:1.

The degassing of the polymer powder takes place in at least one degassing vessel, wherein the pressure of the gas flow is decreased to remove the gas from powder. The degassing section 18, 20 can comprise a product receiver 18 for separating gas from the polymer powder and a gas surge drum 20. The polymer powder is pneumatically conducted from the collecting vessel 7 to the product receiver 18 or a second reactor.

The pressure of the gas from the gas collecting vessel can be increased in a compressor 21 before the gas is recycled to a gas phase reactor, directly or through a recovery system/section.

Figure 2:
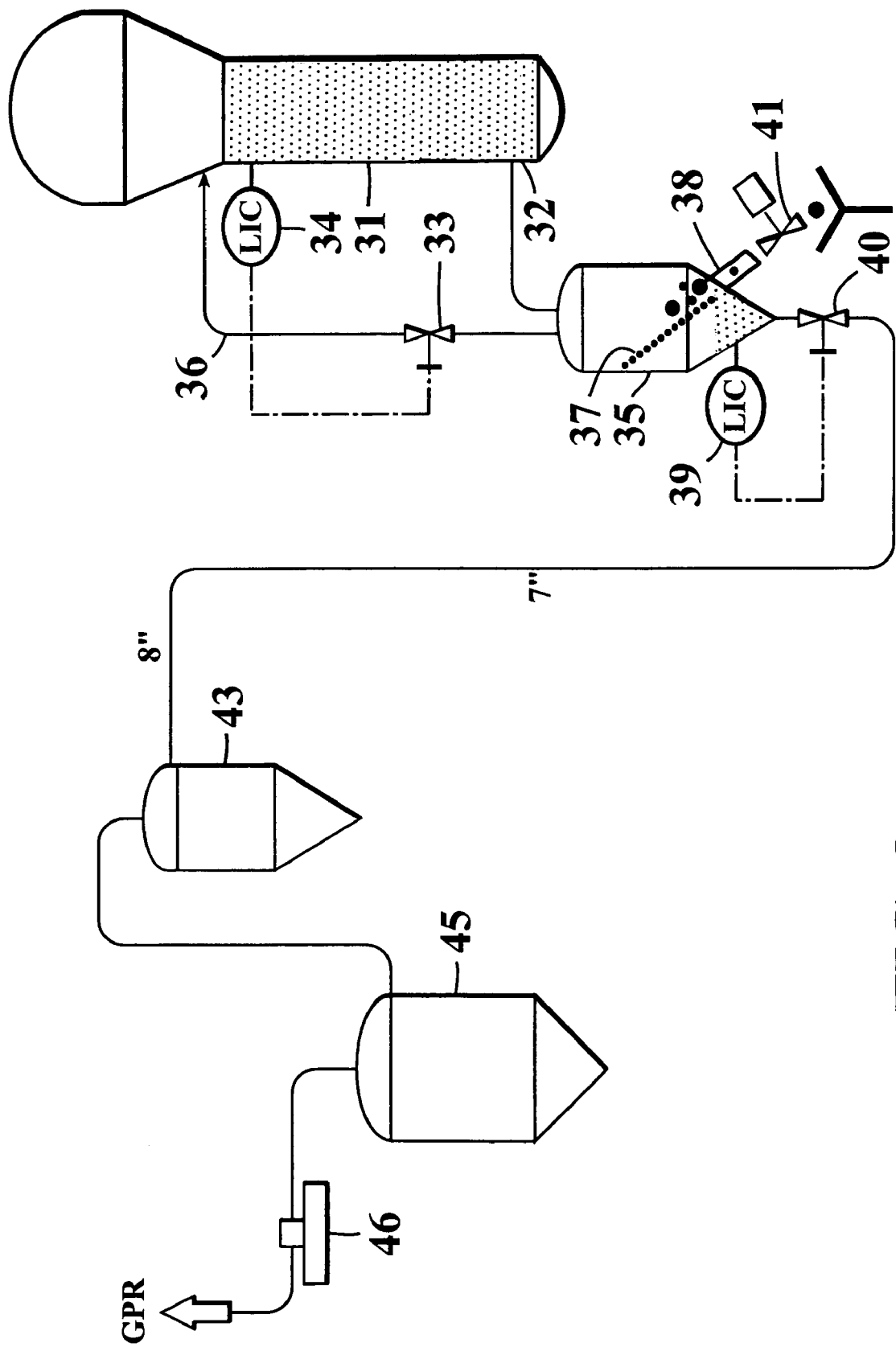
FIG. 2 depicts in a schematical fashion a second embodiment of the present invention comprising a fluidized bed reactor with an outlet nozzle, a collecting vessel, a control valve operated under the control of a level indicator, and a processing section for separating gas containing unreacted monomers from the polymer powder.

FIG. 2 shows another preferred embodiment for continuous withdrawal. The parts of the equipment are largely the same as in the previous embodiment, viz.:

31. gas phase reactor
32. outlet nozzle of gas phase reactor
33. control valve for gas
34. level indicator/controller
35. collecting tank
36. recycle line
37. screen
38. outlet nozzle to remove lumps from collecting tank
39. level indicator/controller
40. control valve to regulate the flow of powder
41. On-off valve for removal of lumps
43, 45. collecting tanks of degassing section
46. compressor In the embodiment shown in FIG. 2, the outlet nozzle 32 of the gas phase reactor 31 is combined with a separate collecting vessel 35, which can be used for separating lumps from the fluid comprising polymer powder and gas. The bed level of the gas phase reactor 31 is controlled by a recycle valve (control valve) 33 fitted in the recycle line 36 connected to the gas space of the collecting vessel. Gas is recycled to the upper part of the reactor above the fluidized bed and the bed height gives the necessary pressure difference for conducting the polymer and the gas to the collecting vessel 35.

The collecting vessel 35 is preferably provided with a separate level controller 39 and a control valve 40 and polymer is pneumatically conducted under the influence of the pressure of the collecting vessel 35 to a degassing vessel 43 or to a subsequent reactor. It is preferred to provide the collecting vessel with a screen 37 for collecting the lumps and with a separate discharge nozzle 38 for the lumps. The control valve 40 may be operated either intermittently or continuously. It is preferred to operate the valve 40 continuously.

The operation of the degassing section 43-46 is similar to that of the first embodiment explained above.

The polymer continuously withdrawn can be directly or indirectly fed into another gas phase reactor.

The present invention can be used for producing homo- and copolymers from monomers selected from the group of $C_2$ to $C_{16}$ olefins and mixtures thereof. Preferably the monomer is ethylene, propylene, 1-butene, 4-methyl-1-pentene, 1-hexene, a diene, or cyclic olefin, or a mixtures thereof.

The following non-limiting Examples illustrate the invention.

COMPARATIVE EXAMPLE

A production scale gas phase reactor was operated at 85° C. temperature and 20 bar pressure with a bed level of 15 m as follows:

Polymer containing active polymerization catalyst was fed into the gas phase reactor from a loop reactor at a rate of 6 metric tons per hour. The feed rates of ethylene, hydrogen and 1-butene were adjusted so that desired concentrations in the gas phase reactor were reached. As a consequence, the polymer production rate in the gas phase reactor was 8 tons per hour and the polymer taken out of the reactor had an $MFR_{21}=11$ and density=947 kg/m$^3$.

The polymer was collected from the reactor using a conventional, batchwise product outtake system, where the polymer was collected into a 3.7 m$^3$ receiving tank. Two identical systems were used. The diameter of the outtake nozzle was 8 inches. The period between two successive outtakes was two minutes, i.e. four minutes for each individual system. During a normal operation the bed level was found to oscillate with a 20 cm amplitude. The reactor could be operated several days without a shut-down.

An experiment to operate the product outtake with its maximum capacity was made, and then the capacity was found to be 20 tons per hour.

EXAMPLE

A product outtake system according to the present invention was installed in the gas phase reactor of the Comparative example. The diameter of the nozzle was 2 inches (50 mm). Every minute the control valve was fully opened for a few seconds to prevent clogging of the valve. The conventional discontinuous outtake was set to operate once an hour to remove any lumps from the reactor. No lumps were actually collected from the reactor during the test period and it was thus concluded that the operation frequency of the discontinuous outlet could have been even lower.

The conditions of the reactor were similar to the Comparative example. During the normal operation the bed level was found to oscillate with a 5 cm amplitude. The reactor was operated several days in a stable fashion until the test was interrupted.

In an experiment according to the Comparative example the maximum capacity of the outtake was found to be 45 tons per hour.

The invention claimed is:

1. An apparatus for discharging polymer from a continuously operated gas phase reactor having an upper part and a bed, wherein at least one monomer is polymerized in the bed which contains active catalyst formed by catalyst and polymer particles suspended in a fluid, said bed defining a fluidized bed level in said reactor, said apparatus comprising:
   an outlet nozzle communicating with the fluidized bed of the gas phase reactor,
   a collecting vessel placed in communication with the outlet nozzle for separating gas from solid material, with a screen for collecting lumps within said collecting vessel and a separate discharge nozzle for the lumps, the discharge nozzle being adjacent to the screen;
   a gas recycle line for recycling gas from the gas space of said collecting vessel to the upper part of said reactor;
   a continuously operating valve for controlling the gas flow in said gas recycle line and adjusting the amount of polymer powder withdrawn from the reactor via the outlet nozzle, the valve also adjusting the discharge rate of the polymer powder so as to maintain a constant bed level during polymerization;
   a continuously operating control valve for regulating the flow of polymer powder from said collecting vessel; and
   an on-off valve for removal of lumps from said collecting vessel.

2. The apparatus according to claim 1, wherein the continuously operative valve is connected to the collecting vessel.

3. The apparatus according to claim 1 or 2, wherein the collecting vessel comprises a gas space which is connected to the gas phase reactor via a gas conduit.

4. The apparatus according to claim 1, wherein the continuously operated valve is a ball valve, a V-ball valve or a hose valve.

5. The apparatus according to claim 1, wherein said outlet nozzle is provided with a grid flush mounted at the reactor wall.

6. The apparatus according to claim 1, wherein said means of controlling the operation of the control valve is a control signal obtained from a bed level controller.

7. The apparatus according to claim 1, wherein the collecting vessel has a separate control valve to pneumatically conduct polymer to a collecting tank.

8. The apparatus according to claim 1, wherein the screen is slanted.

9. The apparatus according to claim 1, wherein the lumps have a diameter of about 6 to 15 mm.

10. The apparatus according to claim 1, further comprising a level controller for controlling the level of polymer powder in said collecting vessel manipulating said control valve.

11. An apparatus for discharging polymer from a continuously operated gas phase reactor having an upper part and a bed, wherein at least one monomer is polymerized in the bed which contains active catalyst formed by catalyst and polymer particles suspended in a fluid, said bed defining a fluidized bed level in said reactor, said apparatus comprising:
   an outlet nozzle communicating with the fluidized bed of the gas phase reactor,
   a collecting vessel placed in communication with the outlet nozzle for separating gas from solid material, with a screen for collecting lumps within said collecting vessel and a separate discharge nozzle for the lumps, the discharge nozzle being adjacent to the screen;
   a gas recycle line for recycling gas from the gas space of said collecting vessel to the upper part of said reactor;
   a continuously operating valve for controlling the gas flow in said gas recycle line, and simultaneously adjusting the amount of polymer powder withdrawn from the reactor via the outlet nozzle;
   a controller that controls the operation of the valve for adjusting the discharge rate of the polymer powder so as to maintain a constant bed level during polymerization;
   a continuously operating control valve for regulating the flow of polymer powder from said collecting vessel; and
   an on-off valve for removal of lumps from said collecting vessel.

12. The apparatus according to claim 11, wherein the continuously operative valve is connected to the collecting vessel.

13. The apparatus according to claim 11, wherein the collecting vessel comprises a gas space which is connected to the gas phase reactor via a gas conduit.

14. The apparatus according to claim 11, wherein the continuously operated valve is a ball valve, a V-ball valve or a hose valve.

15. The apparatus according to claim 11, wherein said outlet nozzle is provided with a grid flush mounted at the reactor wall.

16. The apparatus according to claim 11, wherein said controller that controls the operation of the control valve is a control signal obtained from a bed level controller.

17. The apparatus according to claim 11, wherein the collecting vessel has a separate control valve to pneumatically conduct polymer to a collecting tank.

18. The apparatus according to claim 11, wherein the screen is slanted.

19. The apparatus according to claim 11, wherein the lumps have a diameter of about 6 to 15 mm.

20. The apparatus according to claim 11, further comprising a level controller for controlling the level of polymer powder in said collecting vessel manipulating said control valve.

* * * * *